US005802257A

United States Patent [19]

Kato

[11] Patent Number: 5,802,257

[45] Date of Patent: Sep. 1, 1998

[54] INFORMATION PROCESSING APPARATUS, METHOD AND MEMORY MEDIUM THAT CONTROL A BOLD PROCESS IN ACCORDANCE WITH THE SETTING OF A FACSIMILE MODE

[75] Inventor: Takahiro Kato, Yokohama, Japan

[73] Assignee: Canon Kabushiki Kaisha, Tokyo, Japan

[21] Appl. No.: 561,823

[22] Filed: Nov. 22, 1995

[30] Foreign Application Priority Data

| | | | |
|---|---|---|---|
| Nov. 25, 1994 | [JP] | Japan | 6-290877 |
| Nov. 10, 1995 | [JP] | Japan | 7-292753 |

[51] Int. Cl.$^{6}$ .............................. G06T 5/00; H04N 1/387

[52] U.S. Cl. .............................. 395/106; 395/109; 395/110; 395/114; 358/442; 358/447; 358/435; 358/468; 358/296; 707/542

[58] Field of Search .............................. 395/805, 106, 395/109, 112, 114, 171, 172, 788, 789, 110, 707, 592, 345, 471, 472, 526, 527; 358/400, 401, 442, 468; 382/258

[56] References Cited

U.S. PATENT DOCUMENTS

| | | | |
|---|---|---|---|
| 4,703,323 | 10/1987 | Troupes et al. | 345/194 |
| 4,947,345 | 8/1990 | Paradise et al. | 358/442 |
| 4,994,988 | 2/1991 | Yokoi | 395/112 |
| 5,177,625 | 1/1993 | Nakashima et al. | 358/468 |
| 5,257,869 | 11/1993 | Yoshikawa | 400/304 |
| 5,351,314 | 9/1994 | Vaezi | 382/264 |
| 5,463,295 | 10/1995 | Inde | 358/442 |
| 5,471,563 | 11/1995 | Dennis et al. | 395/114 |
| 5,511,149 | 4/1996 | Hayano | 395/112 |
| 5,530,558 | 6/1996 | Nachman | 358/442 |
| 5,552,894 | 9/1996 | Aiba | 358/298 |
| 5,583,646 | 12/1996 | Yamamoto et al. | 358/296 |
| 5,666,489 | 9/1997 | Fite, Jr. et al. | 395/200.5 |
| 5,684,930 | 11/1997 | Mochizuki | 395/106 |

OTHER PUBLICATIONS

Kelly, Mastering WordPerfect, SYBEX Inc., pp. 45–46, 59, 74, 153–154, 163, 169–172, 1986.

*Primary Examiner*—Joseph H. Feild
*Assistant Examiner*—Jae-Hee Choi
*Attorney, Agent, or Firm*—Fitzpatrick, Cella, Harper & Scinto

[57] ABSTRACT

An information processing apparatus is constructed by a judging unit for judging a set mode and a control unit for performing a bold process to an object in a document and outputting the document to another apparatus such as a printer in the case where the judged mode is a facsimile mode and for not performing the bold process to the object in the document and outputting the document to another apparatus in the case where the judged mode is a normal print mode. The control unit obtains information indicating whether the printer has a rendering function or not through a two-way interface. When the printer has the rendering function, the document is outputted to the printer in a format of a page describing language. When the printer doesn't have the rendering function, the document is outputted to the printer in a form of image data. The bold process changes characters in the document to a bold type or changes a line width of lines in the document to a thick line width.

51 Claims, 8 Drawing Sheets

FIG. 2
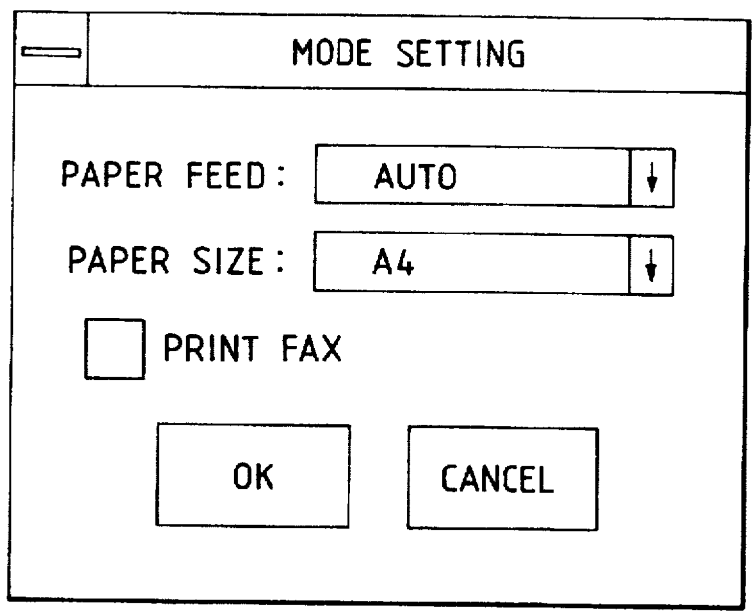
FIG. 3A
ABC ABC
ORIGINAL BOLD
FIG. 3B
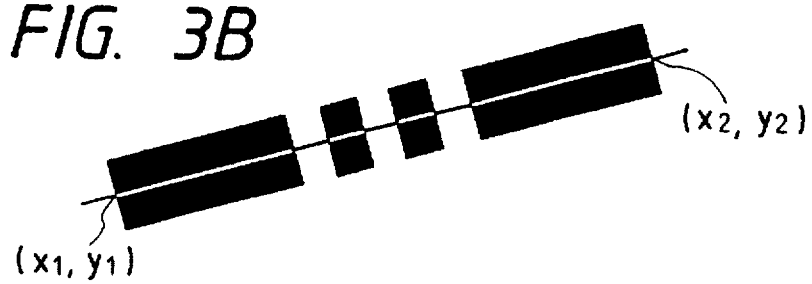

PDL/IMAGE GENERATION
OBTAIN OUTPUT MODE
101
FAX TRANSMISSION MODE ?
102
NO
YES
OBTAIN COMMUNICATION RESOLUTION
103
COMMUNICATION RESOLUTION < PRINT RESOLUTION ?
104
NO
YES
SET BOLD INDEX
105
OUTPUT OF CHARACTER ?
106
NO
YES
A
OUTPUT OF LINE ?
108
NO
YES
RESET CHARACTER TYPE
107
RESET LINE THICKNESS
109
A
END

INFORMATION PROCESSING APPARATUS, METHOD AND MEMORY MEDIUM THAT CONTROL A BOLD PROCESS IN ACCORDANCE WITH THE SETTING OF A FACSIMILE MODE

BACKGROUND OF THE INVENTION

1. Field of the Invention

The invention relates to information processing apparatus and method for replacing each object of a document to a page describing language or image data and outputting to another apparatus. The invention also relates to a memory medium for storing a program which is executed by the information processing apparatus.

2. Related Background Art

Hitherto, in a document printing system for printing output information edited by such a kind of information processing apparatus, it is most preferential to reconstruct a document whose printing is requested onto a print paper at a high fidelity. Therefore, any objects (character, line, figure, etc.) in the document are processed by a printing program so as to be printed as requested and are outputted to a printer.

In the document printing system in such a conventional information processing apparatus, since it is a main object to print the edited document at a high fidelity, a small character, a character of a thin line, a figure of a thin line, or the like is also reconstructed in a range of a resolution of the printer.

However, when the user wants to read such a printed matter of the document to a facsimile apparatus as a facsimile (hereinafter, also abbreviated to FAX) original and to transmit it, since a resolution (sub-scanning line density of the CCITT standard is equal to 3.85 lines/mm) of the facsimile is lower than the resolution of the printer, there is a problem such that the document data is transmitted in a state in which some information is extinguished like a case where the character is broken or the line is extinguished.

The present invention is made to solve the above problems. It is an object of the invention to provide information processing apparatus and method in which output conditions set for each object of a document are reset so as to emphasize and output the object by forming a page description language or image data. The present invention also provides a memory medium in which a program showing the information processing method has been stored.

To solve the above problems, according to the present invention, there is provided an information processing apparatus comprising: judging means for judging a mode set; and control means for performing a bold process to an object in a document and outputting the processed document to another apparatus when the mode judged by the judging means is a first mode and for not performing the bold process to the object in the document and directly outputting the document to another apparatus when the mode judged by the judging means is a second mode.

To solve the above problems, according to the invention, there is provided an information processing apparatus comprising: a CPU for judging a mode set, for performing a bold process to an object in a document in case of the first mode, and for not performing the bold process to the object in the document in case of the second mode; and an output interface for outputting the document to another apparatus.

To solve the above problems, according to the invention, there is provided an information processing method comprising the steps of: judging a mode set; performing a bold process to an object in a document and outputting the processed document to another apparatus when the mode judged is the first mode; and not performing the bold process to the object in the document and directly outputting the document to another apparatus when the judged mode is the second mode.

To solve the above problems, according to the invention, there is provided a memory medium which stores a program for judging a mode set, for performing a bold process to an object in a document and outputting the processed document to another apparatus when the judged mode is the first mode, and for not performing the bold process to the object in the document and directly outputting the document to another apparatus when the judged mode is the second mode.

BRIEF DESCRIPTION OF THE DRAWINGS

FIG. 2 is a diagram showing an example of a mode setting picture plane which is displayed in the display shown in FIG. 1;

FIGS. 3A and 3B are diagrams showing an example of a print in an FAX original mode which is printed from an output device shown in FIG. 1;

BRIEF DESCRIPTION OF THE PREFERRED EMBODIMENTS (First embodiment)

The invention will now be described in detail with reference to the drawings.

Figure 1:
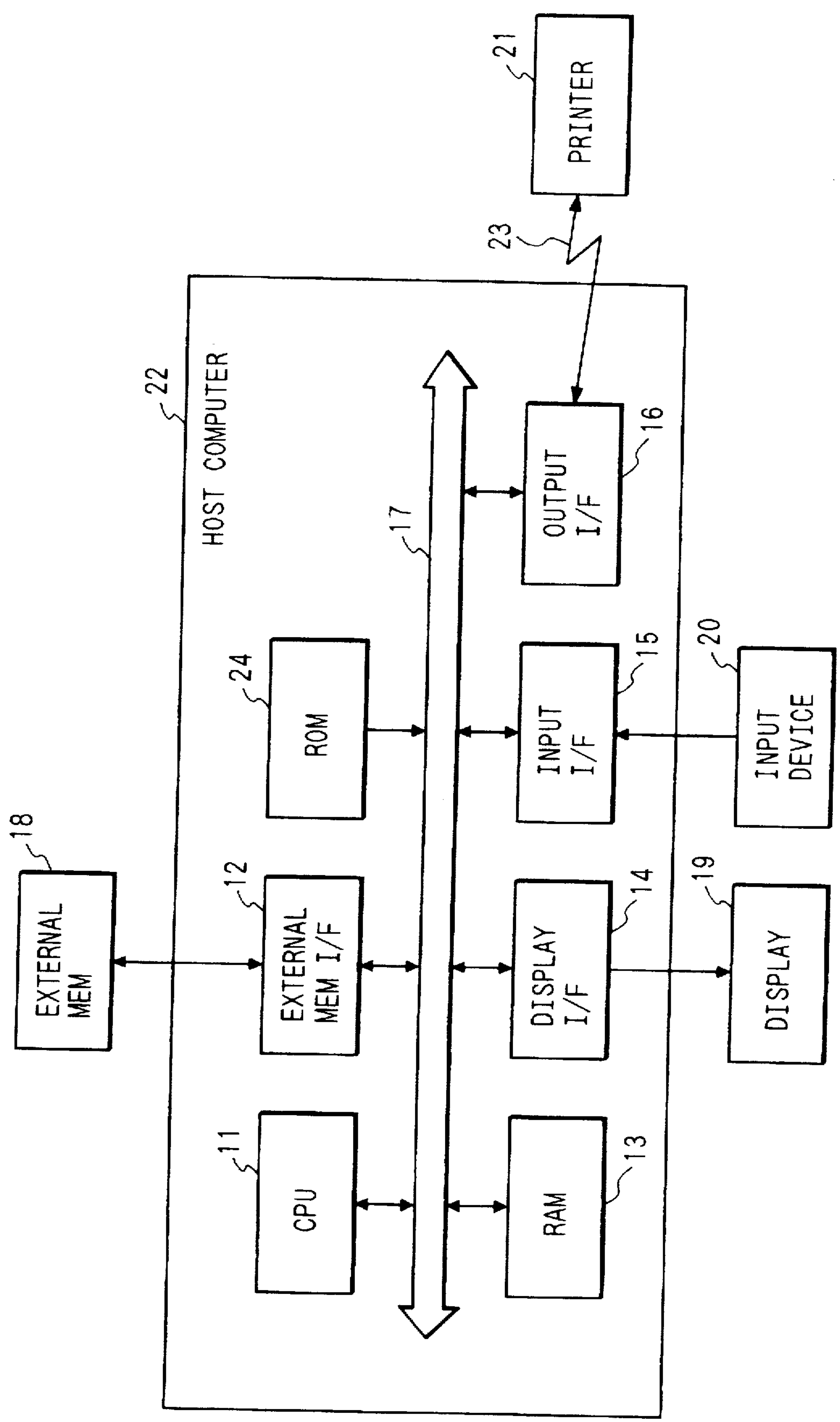
FIG. 1 is a block diagram for explaining a construction of an information processing apparatus showing an embodiment of the invention.

FIG. 1 is a block diagram for explaining an information processing apparatus such as a host computer or the like showing an embodiment of the invention.

In the diagram, reference numeral 11 denotes a CPU (central processing unit). The CPU 11 processes text information, figure information, image information, or the like inputted from an input device 20 such as keyboard, mouse, scanner, or the like which is connected through a bus 17 on the basis of a data processing program or the like stored in a detachable external memory 18 (FD or HD). Reference numeral 19 denotes a display which is constructed by a CRT, an LCD, an FLC, or the like and displays a print set picture plane shown in FIG. 2, which will be explained hereinlater. Reference numeral 16 denotes an output interface (I/F) for transferring a page description language (printer language) formed in an RAM 13 to a printer 21, thereby allowing the page description language to be printed. The RAM 13 is constructed by an area for loading the program in the memory 18, an area for forming the foregoing page description language or image data, a work area, and the like.

The printer 21 is connected to the output I/F 16. It is also possible to construct in a manner such that image data is formed by the CPU 11 and the image data is transferred to the printer 21 through the output I/F 16 and is printed out. In this case, an image data forming program has been stored in the memory 18.

Fonts such as bold types or the like and patterns showing a plurality of kinds of line types have been stored in the ROM 24. In order to form image data in the printer 21, an ROM to store the fonts such as bold types or the like and patterns showing a plurality of kinds of line types are provided in the printer 21.

FIG. 2 is a diagram showing an example of a print set picture plane which is displayed on the display 19 shown in FIG. 1. The print set picture plane is displayed upon activation of the printing program loaded in the RAM 13.

As shown in the diagram; the set picture plane is displayed on the display 19 and the operations for setting a paper feeding method, a paper size, an FAX-original print mode, and the like are executed by the input device 20 represented by the keyboard and mouse. In the example, an FAX-original mode is made effective when an item "Print fax" is designated.

FIGS. 3A and 3B are diagrams showing examples of FAX-original mode prints in the case where the printer 21 analyzes the page describing language outputted from the output I/F 16 shown in FIG. 1 and forms the image data and prints.

In case of outputting the image data from the output I/F 16, the image data that is outputted to the printer 21 is the FAX-original mode print shown in FIGS. 3A and 3B.

In the diagrams, FIG. 3A relates to the case of a character print and FIG. 3B relates to the case of a line print. In the character print of FIG. 3A, a bold attribute is added to original characters whose printing is requested and the page description language is formed and outputted to the printer 21. In the line print of FIG. 3B, the page description language is formed so as to thicken a line type and is outputted to the printer 21.

In case of forming the image data in a host computer 22 and printing by the printer 21, the bold-processed image data of the character print as shown in FIG. 3A and the bold-processed image data of the line print as shown in FIG. 3B are formed by the CPU 11 by using an ROM 24 and are outputted to the printer 21.

A document processing method of the information processing apparatus 22 according to the invention will now be described hereinbelow with reference to flowcharts shown in FIGS. 4 and 5. Programs shown in the flowcharts of FIGS. 4 and 5 have been stored in the external memory 18 such as FD, HD, or the like. After the programs were loaded into the RAM 13, they are executed by the CPU 11.

Figure 4:
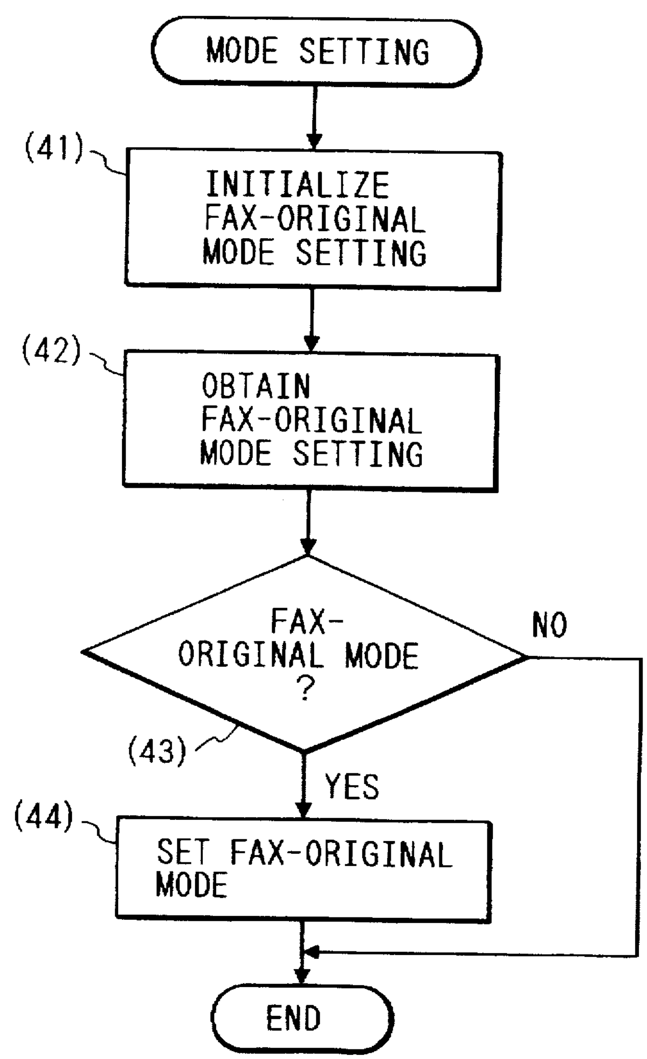
FIG. 4 is a flowchart showing a mode setting process of an information processing apparatus according to the first embodiment of the invention.
Figure 5:
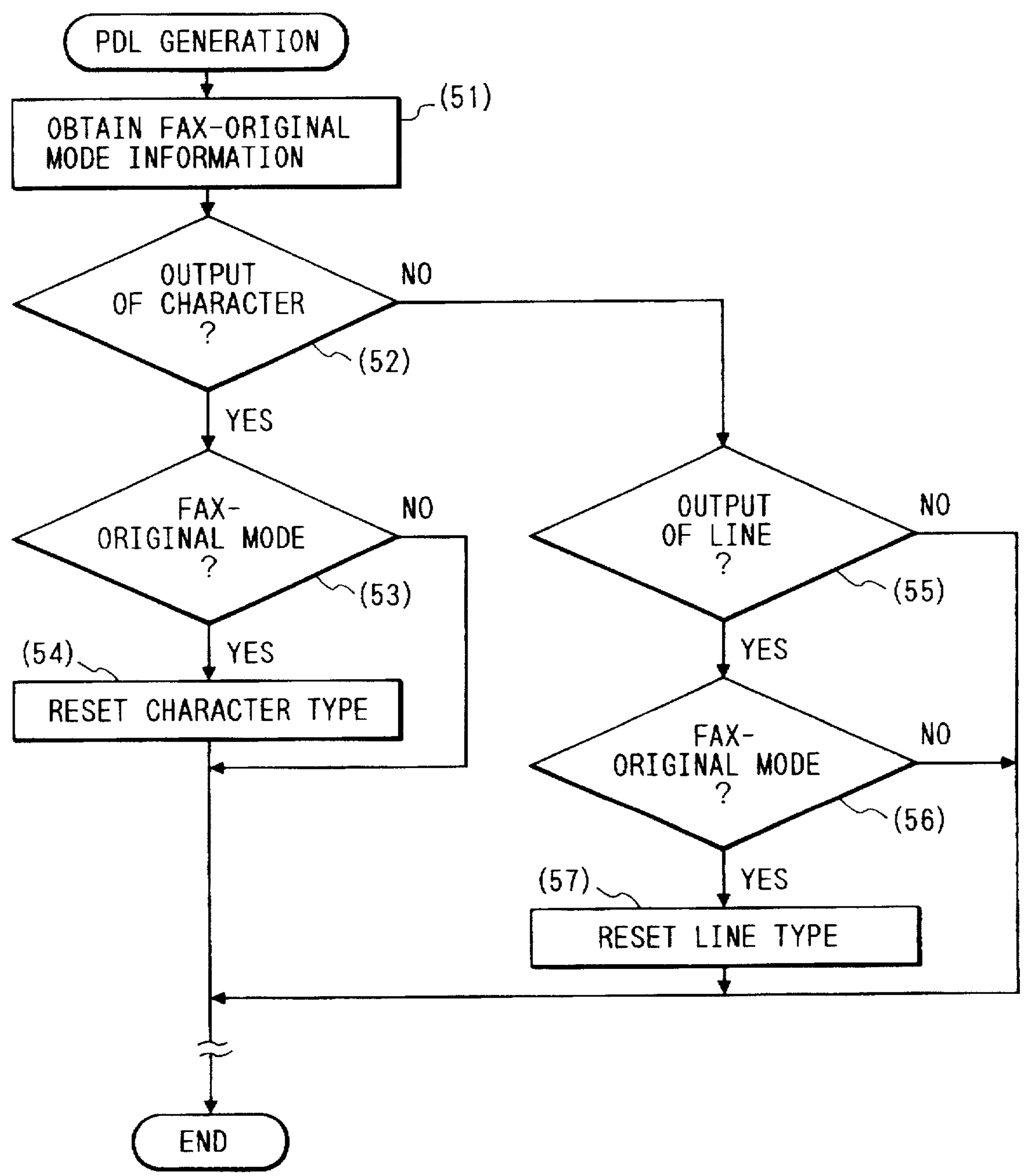
FIG. 5 is a flowchart showing a generating process of the information processing apparatus according to the first embodiment of the invention.

FIGS. 4 and 5 are the flowcharts showing an embodiment of the document processing method of the information processing apparatus according to the invention. FIG. 4 corresponds to a mode setting process. FIG. 5 corresponds to a generating process. Reference numerals (41) to (44) and (51) to (57) denote processing steps.

In response to a mode setting instruction from the user by the input device 20, the CPU 11 in the information processing apparatus activates the program in the RAM 13 and allows the mode setting picture plane (refer to FIG. 2) to be displayed by the display 19 through a display I/F 14. In this instance, processes of FIG. 4 are called together with processes for setting each mode.

Specifically speaking, The CPU 11 initializes an FAX-original mode setting that is being set in FAX-original mode initializing step (41) and a mode setting picture plane is displayed on the display 9 on the basis of the FAX-original mode setting. In the embodiment, the initial value gives an FAX-original mode OFF in a default state and the page describing language or image data which is not subjected to the bold process as in the conventional method is formed in accordance with an output instruction.

Subsequently, the user obtains the FAX-original mode setting on the display picture plane set by the input device 20 in FAX-original mode obtaining step (42).

In FAX-original mode judging step (43), a check is made to see if the FAX-original mode setting obtained by the CPU 11 in step (42) is an FAX-original mode ON or not. If YES, the FAX-original mode is set into the FAX-original mode setting that is being set in FAX-original mode setting step (44). Those set information is stored into the work area in the RAM 13.

Thus, the above mode setting is made effective when an output instruction is performed.

When the output instruction from the user by the input device 20 shown in FIG. 1 is executed, the program shown in the flowchart of FIG. 5 is loaded into the RAM 13 from the memory 18 that is detachable to/from the information processing apparatus.

When the program shown in the flowchart of FIG. 4 is loaded from the memory 18 into the RAM 13, the program shown in FIG. 5 can be also loaded together.

First, in FAX-original mode obtaining step (51), the CPU 11 obtains the FAX-original mode setting information which was set by the processes in FIG. 4 from the RAM 13.

In character output judging step (52), the CPU 11 judges whether an object whose output is requested is a character or not. If it is judged that the object is a character output, a check is made in FAX-original mode judging step (53) to see if the FAX-original mode setting obtained in step (51) is ON or OFF. When it is judged that the setting is the FAX-original mode ON, a page description language in which a bold attribute has additionally been set for the character whose output is requested is formed and outputted in character type resetting step (54). When the printer 21 doesn't have a function to analyze the page description language, the image data in which the bold process has been performed to the character is formed by the CPU 11 by using the ROM 24 and is outputted.

Thus, as shown in FIG. 3A, although the bold output is realized by shifting the character pattern, the deviation amount needs to be thick within a range where a character font of an original is not broken and to an extent such as not to break the character font of the original upon reading and transmission in the facsimile apparatus. In the embodiment, therefore, when the resolution of the printer is equal to 300 dpi, the minimum deviation amount is equal to 1/300 inch. However, since a subscanning line density of the facsimile apparatus (in the standard mode) is a low resolution to be 3.85 lines/mm (=97.79 dots/inch), there is a possibility such that the character is broken unless a thickness of character is equal to about 1/100 inch. Therefore, it is necessary to set a width to 3 dots or more.

The necessary deviation amount, accordingly, is a value in which the minimum width in the character font of the original is subtracted from the above value. In this instance, if the deviation amount is determined every character, the characters are not aligned in case of a sentence or the like. Therefore, the deviation amounts in a page are unified. Namely, the bold process is executed on a page or job unit basis.

In the embodiment, although a thick character is realized by a bold character using a character decorating function, it can be also realized by other decorative character such as an emphasis character or the like. Before the program shown in FIG. 4 or 5 is executed, the CPU 11 obtains ID information indicating whether the printer 21 has a rendering function to form image data or not through a two-way interface 23, thereby forming the image data or page description language in accordance with the presence or absence of the function.

When it is judged that the object is not the character output in step (52), the CPU 11 judges whether the object whose output is requested is a line or a diagram including a line such as circle, rectangle, or the like in line output judging step (55). When it is judged that the object is the line output, a check is made in FAX-original mode judging step (56) to see if the FAX-original mode setting obtained in step (51) is ON or OFF. When it is judged that the FAX-original mode setting is the FAX-original mode ON, a page description language is formed so as to increase a line width than the line or the line of the figure in which the output is requested in line type resetting step (57). When the printer 21 doesn't have the function to analyze the page description language, the CPU 11 forms the image data in which the process to increase the line width was performed to the relevant character by using the ROM 24.

Thus, by increasing the value of line width as shown in FIG. 3B, the line width can be thickened in the width direction around the line of the original as a center.

In case of the line as well, since a width of 3 dots or more is needed in a manner similar to the case of the character, the value which was uniformly thickened by only a difference between the line and the thinnest line in the page is set to a line width and the page description language or image data is formed.

When the character type is reset in character type resetting step (54) or the line type is reset in line type resetting step (57) as mentioned above, the page description language or image data is formed and outputted to the printer 21 through the output I/F 16. In case of forming the image data, the CPU 11 uses the ROM 24.

When FAX-original mode NO, not-line print, and FAX-original mode NO are judged in FAX-original mode judging step (53), line print judging step (55), and FAX-original mode judging step (56), respectively, the CPU 11 forms the page description language or image data as requested in the original and outputs to the printer 21 through the output I/F 16 in a manner similar to the conventional apparatus.

In the embodiment, although the characters and lines in the same page have been uniformly thickened, the invention is not limited to such an example. Prior to resetting the character type and line type, by checking whether the thicknesses of the character and line are equal to predetermined values or more, only the object having a possibility such that it is dropped can be also changed.

In the above embodiment, the output has been reset on the basis of the subscanning line density in the normal (or standard) mode specified by the CCITT standard. However, by making it possible to set the use by each line density such as standard, fine, or super fine in the output setting, a level to change a thickness of character or line can be corrected. Therefore, since the output by the least correction according to the FAX transmitting mode can be performed, a deterioration of output quality can be suppressed.

The present invention can be applied to a system constructed by a plurality of apparatuses or can be also applied to an apparatus-comprising one equipment. The invention can be also applied to a case where the invention is accomplished by supplying a program to a system or an apparatus.

According to the first embodiment as described above, the CPU 11 judges whether a facsimile-original print mode is being set or not. When it is judged that the FAX-original print mode is being set, the output conditions set for each object of the document are reset so that the output form is set to be thick by a predetermined amount, thereby forming the page describing language or image data. Therefore, the facsimile original can be printed by the printer 21 so that each object can be read without dropping when the facsimile original is read.

When the object of the document is the character output, by forming the page description language or image data so that the character type is set to be thicker than the preset set type, the facsimile original can be printed by the printer 21 so that each character object can be read without dropping when the facsimile original is read.

When the image data is formed by the host computer 22, a font of a bold character is selected from the ROM 24 and the image data is formed.

In the case where the object of the document is the line output, the page description language or image data is formed so that the line type is set to be thicker than the present set type. Therefore, when the facsimile original is read, each line object can be printed by the printer 21 so that each line object can be read without dropping.

Since the set amount can be varied in accordance with the resolution of the facsimile, an optimum bold amount such that each object can be read without dropping can be set when the facsimile original is read.

Upon mode setting, after the FAX-original mode setting state was initialized, the FAX-original mode set by the user is obtained and a check is made to see if the FAX-original mode obtained is effective or not. When it is judged to be effective, the FAX-original mode is set to an effective state upon output setting. Therefore, the output mode of each of the subsequent objects can be processed as a desired FAX-original mode.

When the FAX-original mode setting that is being mode set is obtained upon outputting, a check is made to see if the object to be outputted is a character or not. Further, a check is made to see if the FAX-original mode is being set or not. If YES, the page description language or image data is formed so that the character type or line type in which the output is requested is set to be a bold character or a bold line. Therefore, when the facsimile original is read, each object can be printed by the printer 21 as an emphasized object so that each object can be read without dropping.

In case of forming the image data, the CPU 11 selects a font or line pattern which provides a bold character or a bold line from the ROM 24.

(Second embodiment)

Although the first embodiment has been described above as an example with respect to the case where the facsimile original outputted to the printer 21 is read by a facsimile communicating apparatus (not shown) and is transmitted to the partner side, the document printing method of the invention is not limited to such an example.

Figure 6:
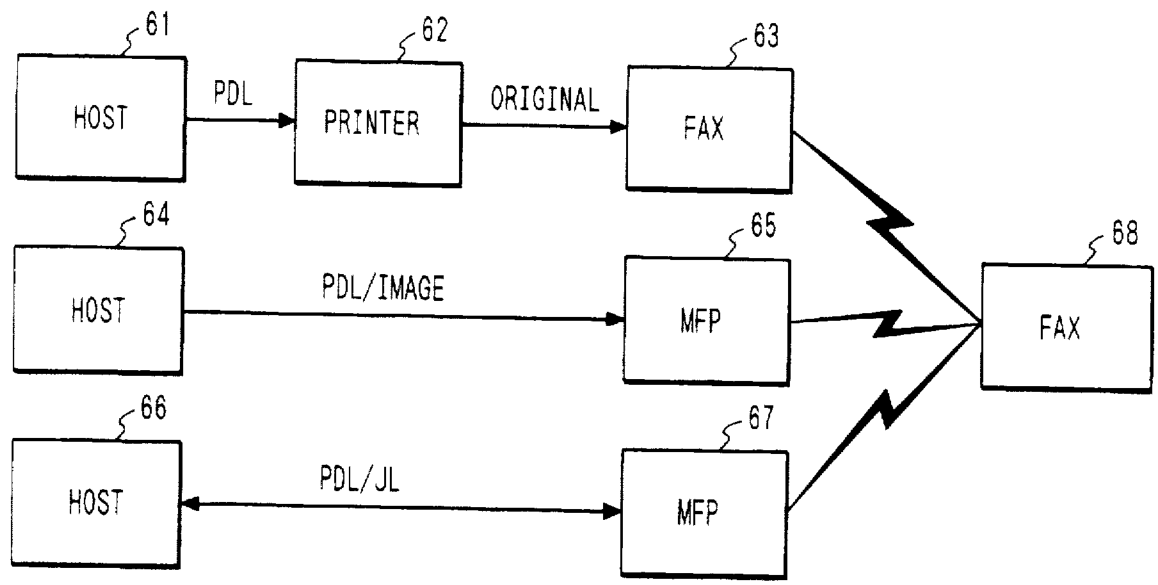
FIG. 6 is a diagram showing an example of a printing system according to the invention.

Many compound apparatus called an MFP (Multi Function Peripheral) such printer with a facsimile function, a copying machine with printer and facsimile functions, and the like have been put into practical use in recent years. The invention is also applied to a printing system in which they are connected to a host computer as shown in FIG. 6. In those systems, an ordinary print output can be directly transmitted to a facsimile or another host computer by the operation from the host computer side in accordance with a similar procedure.

Figure 8:
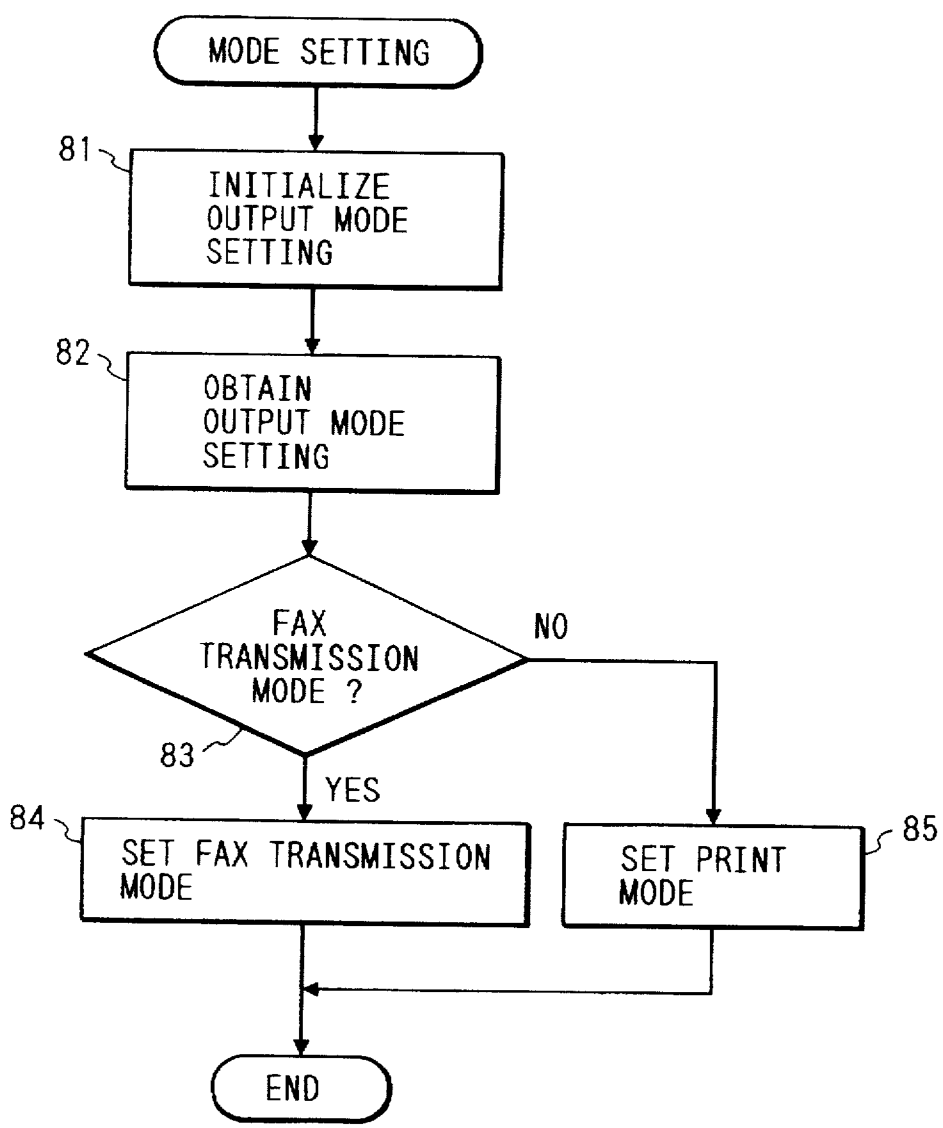
FIG. 8 is a flowchart showing a mode setting process of an information processing apparatus according to the second embodiment of the invention.

When referring to a flowchart of FIG. 8, upon print setting that is executed prior to a print output instruction, first, the CPU 11 initializes the output mode setting during the print setting in output mode initializing step 81 and the print setting picture plane shown in FIG. 2 is displayed on the display 19 on the basis of the output mode setting. In the embodiment, the initial value gives the print output mode and the ordinary print output is performed in the default state.

In output mode obtaining step 82, the CPU 11 obtains the output mode setting on the display picture plane set by the user by the input device 20 from the work area in the RAM 13.

In output mode judging step 83, the CPU 11 judges whether the output mode obtained is a print mode or a facsimile transmission mode. When it is judged that the output mode is the FAX transmission mode, the FAX transmission mode is set and preserved in FAX transmission mode setting step 84.

When it is judged that the output mode is the print mode, the print mode is set and preserved in print mode setting step 85.

By the above processes, the user can designate whether the output for the print output instruction is set to the print output or the facsimile transmission. When an outputting process is started, in a manner similar to the above embodiment, the output mode set in FAX transmission mode setting step or print mode setting step is obtained. When the output mode is the FAX transmission mode, the foregoing bold process is executed with respect to the character and line in the print objects. Even in case of performing the print output or facsimile transmission, the page description language or image data is formed and outputted in accordance with the rendering function of the MFP.

By applying together with the processes shown in the flowchart of FIG. 4 mentioned in the first embodiment, even in the case where the FAX transmission mode is designated as an output mode, the application of the bold process can be separately controlled by the state of the FAX original mode set by the user.

A program shown in the flowchart of FIG. 8 has been stored in the external memory 18. After the program was loaded into the RAM 13, it is executed by the CPU 11.

In the above embodiment, by performing the print setting by the operation of the user, on the basis of the setting obtained by the print setting, whether the bold process is executed or not is decided or a degree of bold process is determined.

The invention, however, is not limited to the above embodiment. In a system to which a two-way interface represented by the standard IEEE 1284, the host computer 22 obtains the information about the resolution in a real-time manner from the ability information (DIS/NSF signal) of the facsimile communicating apparatus on the partner side which is obtained by the initial procedure after the start of the facsimile transmission. On the output processing side which received the information, a degree of bold process can be decided in consideration of the actual resolution which is determined in accordance with the resolution at which the partner facsimile communicating apparatus connected to the line can receive.

Figure 7:
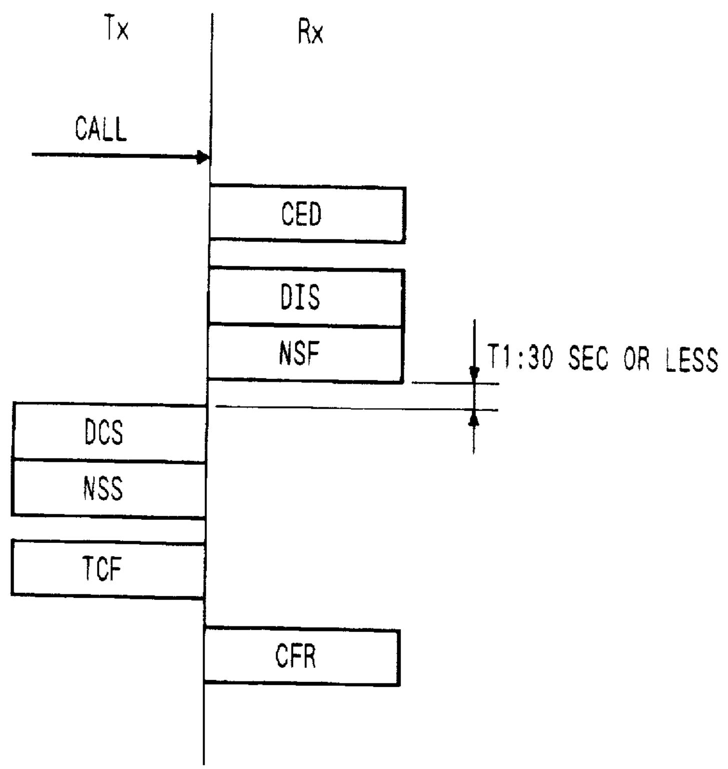
FIG. 7 is a diagram showing an initial procedure of a G3 facsimile according to the invention.

FIG. 7 is a diagram showing an initial procedure of a G3 facsimile recommended in the CCITT standard T.30. A receiving ability of the facsimile communicating apparatus on the partner side is included in the DIS/NSF signal which is sent to the line connection in the diagram. The actual resolution (FAX communication mode) which is used for the communication is determined from the information and the ability on the transmission side. There are resolutions of standard, fine, and super fine in accordance with the order from the low resolution. The subscanning line densities in those modes are set to 3.85 lines/mm, 7.7 lines/mm, and 15.4 lines/mm, respectively.

Figure 9:
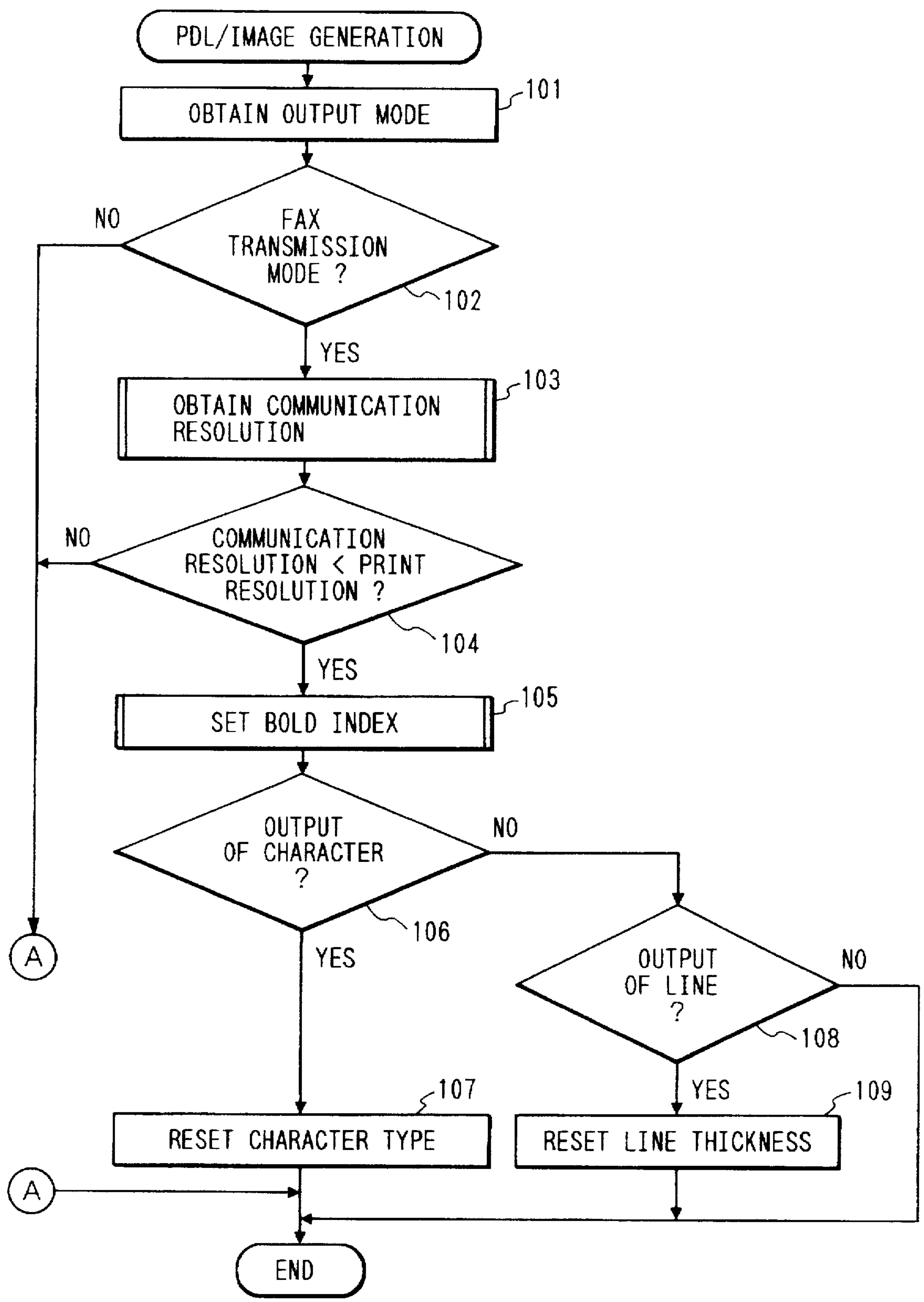
FIG. 9 is a flowchart showing a generating process of the information processing apparatus according to the second embodiment of the invention.
Figure 10:
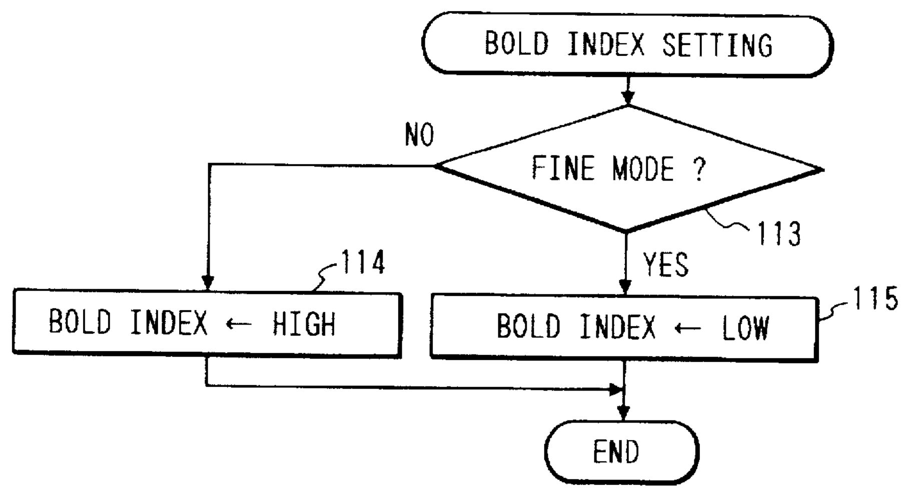
FIG. 10 is a flowchart showing a setting process of a bold index of the information processing apparatus according to the second embodiment of the invention.
Figure 11:
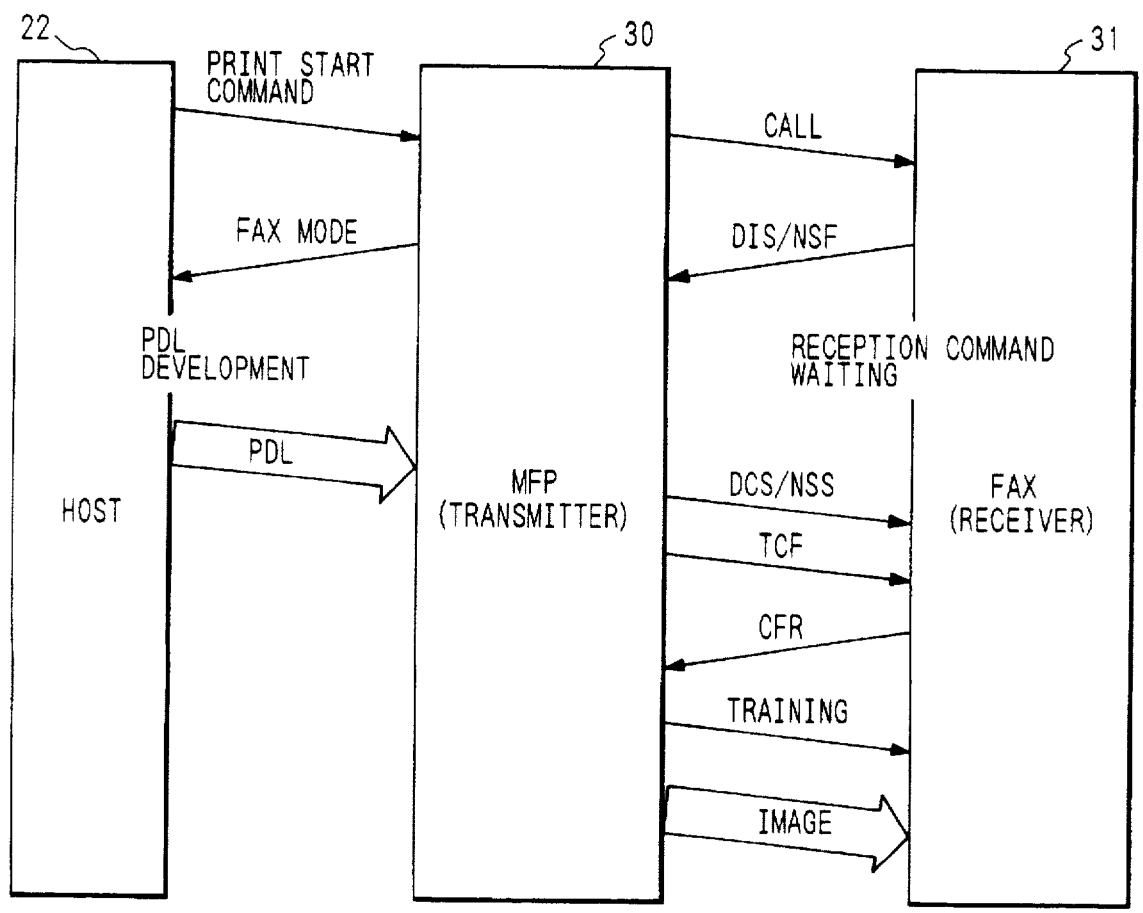
FIG. 11 is a diagram showing an information receiving procedure among apparatuses in the printing system shown in FIG. 6.

FIG. 11 shows a procedure between the apparatuses in the case where the outputting process is executed by the two-way communication of an MFP 67 in the embodiment. As a protocol between a host computer 60 and the MFP 67, a protocol called JL (Job Language) which is used for control between the host and the peripheral equipment is used. By the JL, a pre-procedure for facsimile transmission is executed prior to transmission of a PDL or image data and the information is also notified from the MFP 67. Between the MFP 67 and a facsimile 68, T.30 of the CCITT which is used in the G3 facsimile is used as a protocol. Referring to FIGS. 8 to 10, after the output mode was selected by the processes shown in the flowchart of FIG. 8 in a manner similar to the above embodiment, the control is shifted to a generating process shown in FIG. 9 by an output instruction of the user.

First, in output mode obtaining step 101, the CPU 11 obtains the output mode set by the processes in FIG. 8. In subsequent FAX transmission mode judging step 102, the output mode obtained is judged to see if the output mode is the FAX transmission mode or the print mode.

When it is judged that the output mode is the print mode by the above judgment, the subsequent processes are not executed but the processes in FIG. 9 are finished. To execute the ordinary print output, the PDL or image data is formed in accordance with the presence or absence of the rendering function of the MFP and is outputted to the MFP.

When it is judged by the above judgment that the output mode is the FAX transmission mode, the resolution in the FAX communication mode of the facsimile transmission to be executed from now on, namely, the resolution on the communication is obtained in subsequent FAX communication mode obtaining step 103. The FAX communication mode obtaining process is executed in a step of performing the initial procedure of the standard facsimile communication. In a subsequent message transmitting procedure, the resolution when transmitting data is obtained.

In the FAX communication mode obtained, the resolution when the document is converted to the PDL or image data and the communication resolution in the FAX communication mode obtained are compared by the host computer in resolution comparing step 104.

In resolution comparing step 104, when it is judged that the communication resolution is not lower than the print resolution, since there is no need to execute the bold process, the processes in FIG. 9 are finished. In order to execute the ordinary FAX transmission, a check is made to see if the MFP has the rendering function or not. If YES, the facsimile original is transmitted by the PDL. If the MFP doesn't have the rendering function, the image data is formed by the host computer side and is FAX transmitted.

When it is judged that the communication resolution is lower than the print resolution in resolution comparing step 104, the CPU 11 executes step 105 of setting a bold index.

Bold index setting step 105 will now be specifically explained with reference to FIG. 10. A program shown in a flowchart of FIG. 10 has also been stored in the external memory 18. After the program was loaded into the RAM 13, it is executed by the CPU 11. In the embodiment, the print resolution is set to 300 dpi.

In step 113, a check is made to see if the communication resolution obtained from the MFP is equal to 200 dpi (fine mode) or not. If YES, since there is not so a large difference between the communication resolution and the print resolution (300 dpi) on the host computer, the bold index is set to a low value. When it is judged in step 113 that the resolution is not the fine mode, it is judged that the communication resolution is equal to 100 dpi (standard mode). In this case, since there is a large difference between the communication resolution and the print resolution (300 dpi) on the host computer, the bold index is set to a high value and the processes are finished.

When the bold index setting process is finished, a check is made in character output judging step 106 in FIG. 9 to see if the object whose output is requested is a character or not. If YES, the bold attribute is additionally set to the character whose output is requested in character type resetting step 107 on the basis of the bold index set in step 105. The CPU 11 forms the page description language or image data and outputs to the MFP.

When it is judged in step 106 that the object is not the character output, a check is made in step 108 to see if it is the line output or not. If YES, in line type resetting step 109, the CPU 11 forms the page description language or image data so as to thicken the line width on the basis of the bold index set in step 105 and outputs to the MFP.

Before executing the program shown in the flowchart of FIG. 9, the CPU 11 in the host computer judges the presence or absence of the rendering function of the MFP through the MFP and the two-way interface. When the MFP has the rendering function, the PDL is outputted to the MFP. When the MFP doesn't have the rendering function, the image data is outputted to the MFP. Before the generating process of FIG. 9, the CPU 11 can also execute the judging program of the rendering function at the time of the turn-on of a power source of the host computer 22 or a mode setting process in FIG. 8.

The programs shown in the flowcharts of FIGS. 8, 9, 10, and the like and the judging program of the rendering function in the second embodiment have been stored in the external memory 18 in a manner similar to the first embodiment. After the programs were loaded in the RAM 13, they are executed by the CPU 11.

What is claimed is:

1. An information processing apparatus operable in one of a plurality of modes including a facsimile mode and a non-facsimile mode, said apparatus comprising:

judging means for judging which one of the plurality of modes is set in said apparatus; and control means for performing a bold process to an object in a document and outputting the document to another apparatus in the case where said judging means judges that the facsimile mode is set, and for not performing the bold process to the object in the document and outputting the document to the other apparatus in the case where said judging means judges that the non-facsimile mode is set.

2. An apparatus according to claim 1, wherein the non-facsimile mode is a normal print mode.

3. An apparatus according to claim 1, wherein the other apparatus is a printer.

4. An apparatus according to claim 1, wherein said control means obtains information indicating whether the other apparatus has a rendering function or not through a two-way interface, outputs the document to the other apparatus in a format of a page description language in the case where the other apparatus has the rendering function, and outputs the document to the other apparatus in a format of image data in the case where the other apparatus does not have the rendering function.

5. An apparatus according to claim 1, wherein said bold process changes characters in the document to a bold type.

6. An apparatus according to claim 1, wherein said bold process changes a line width of lines in the document to a thick line width.

7. An apparatus according to claim 1, wherein said control means obtains a resolution of the other apparatus through a two-way interface, compares said resolution with a resolution of said information processing apparatus, and changes a degree of said bold process on the basis of a comparison result.

8. An apparatus according to claim 7, wherein said control means emphasizes the degree of said bold process in the case where the resolution of the other apparatus is lower than the resolution of said information processing apparatus.

9. An apparatus according to claim 1, wherein the other apparatus is a compound apparatus constructed by a facsimile and a printer.

10. An information processing apparatus operable in one of a plurality of modes including a facsimile mode and a non-facsimile mode, said apparatus comprising:

A CPU for judging which one of the plurality of modes is set in said apparatus, and for performing a bold process to an object in a document in the case where the facsimile mode is set, and for not performing the bold process to the object in the document in the case where the non-facsimile mode is set; and an output interface for outputting the document to another apparatus.

11. An apparatus according to claim 10, wherein the non-facsimile mode is a normal print mode.

12. An apparatus according to claim 10, wherein the other apparatus is a printer.

13. An apparatus according to claim 10, wherein said CPU obtains information indicating whether the other apparatus has a rendering function or not through a two-way interface, outputs the document to the other apparatus in a format of a page description language in the case where the other apparatus has the rendering function, and outputs the document to the other apparatus in a format of image data in the case where the other apparatus does not have the rendering function.

14. An apparatus according to claim 10, wherein said bold process changes characters in the document to a bold type.

15. An apparatus according to claim 10, wherein said bold process changes a line width of lines in the document to a thick line width.

16. An apparatus according to claim 10, wherein said CPU obtains a resolution of the other apparatus through a two-way interface, compares said resolution with a resolution of said information processing apparatus, and changes a degree of said bold process on the basis of a comparison result.

17. An apparatus according to claim 16, wherein said CPU emphasizes the degree of said bold process in the case where the resolution of the other apparatus is lower than the resolution of said information processing apparatus.

18. An apparatus according to claim 10, wherein the other apparatus is a compound apparatus constructed by a facsimile and a printer.

19. An information processing method in an information processing apparatus operable in one of a plurality of modes including a facsimile mode and a non-facsimile mode, said method comprising the steps of:

judging which one of the plurality of modes is set in the apparatus; and performing a bold process to an object in a document and outputting the document to another apparatus in the case where said judging step judges that the facsimile mode is set, and not performing the bold process to the object in the document and outputting the document to the other apparatus in the case where said judging step judges that the non-facsimile mode is set.

20. A method according to claim 19, wherein the non-facsimile mode is a normal print mode.

21. A method according to claim 19, wherein the other apparatus is a printer.

22. A method according to claim 19, wherein information indicating whether the other apparatus has a rendering function or not is obtained through a two-way interface, in the case where the other apparatus has the rendering function, the document is outputted to the other apparatus in a format of a page description language, and in the case where the other apparatus does not have the rendering function, the document is outputted to the other apparatus in a format of image data.

23. A method according to claim 19, wherein said bold process changes characters in the document to a bold type.

24. A method according to claim 19, wherein said bold process changes a line width of lines in the document to a thick line width.

25. A method according to claim 19, wherein a resolution of the other apparatus is obtained through a two-way interface, said resolution is compared with a resolution of the information processing apparatus, and a degree of said bold process is changed on the basis of a comparison result.

26. A method according to claim 25, wherein the degree of said bold process is emphasized in accordance with a difference between the resolutions in the case where the resolution of the other apparatus is lower than the resolution of the information processing apparatus.

27. A method according to claim 19, wherein the other apparatus is a compound apparatus constructed by a facsimile and a printer.

28. A memory medium for storing a program which is executed by an information processing apparatus operable in one of a plurality of modes including a facsimile mode and a non-facsimile mode, wherein the program comprises the steps of:

judging which one of the plurality of modes is set in the apparatus; and in the case where said judging step judges that the facsimile mode is set, performing a bold process to an object in a document and outputting the document to another apparatus, and in the case where said judging step judges that the non-facsimile mode is set, not performing the bold process to the object in the document and outputting the document to the other apparatus.

29. A memory medium according to claim 28, wherein the non-facsimile mode is a normal print mode.

30. A memory medium according to claim 28, wherein the other apparatus is a printer.

31. A memory medium according to claim 28, wherein information indicating whether the other apparatus has a rendering function or not is obtained through a two-way interface, in the case where the other apparatus has the rendering function, the document is outputted to the other apparatus in a format of a page description language, and in the case where the other apparatus does not have the rendering function, the document is outputted to the other apparatus in a format of image data.

32. A memory medium according to claim 28, wherein said bold process changes characters in the document to a bold type.

33. A memory medium according to claim 28, wherein said bold process changes a line width of lines in the document to a thick line width.

34. A memory medium according to claim 28, wherein a resolution of the other apparatus is obtained through a two-way interface, said resolution is compared with a resolution of the information processing apparatus, and a degree of said bold process is changed on the basis of a comparison result.

35. A method according to claim 34, wherein the degree of said bold process is emphasized in accordance with a difference between the resolutions in the case where the resolution of the other apparatus is lower than the resolution of the information processing apparatus.

36. A method according to claim 28, wherein the other apparatus is a compound apparatus constructed by a facsimile and a printer.

37. An image processing apparatus operable in one of a plurality of modes including a facsimile mode and a print mode, said apparatus comprising:

transmission means for, when the facsimile mode is designated, performing a correction process to image data including a character or a line so as to avoid deformation of the character or omission of the line in a subsequent printing process of the image data by a facsimile apparatus and for transmitting the image data, as corrected by the correction process, to the facsimile apparatus; and output means for, when the print mode is designated, outputting the image data uncorrected by the correction process to a printer.

38. An image processing apparatus according to claim 37, wherein the correction process comprises a bold process.

39. An image processing apparatus according to claim 38, wherein the bold process is executed in different degrees according to different resolutions of the facsimile apparatus.

40. An image processing apparatus according to claim 37, wherein said image processing apparatus is a host computer.

41. An image processing apparatus according to claim 37, wherein the correction process is performed only for the character and the line.

42. An image processing method in an image processing apparatus operable in one of a plurality of modes including a facsimile mode and a print mode, said method comprising the steps of:

when the facsimile mode is designated, performing a correction process to image data including a character or a line so as to avoid deformation of the character or omission of the line in a subsequent printing process of the image data by a facsimile apparatus and transmitting the image data, as corrected by the correction process, to the facsimile apparatus; and when the print mode is designated, outputting the image data uncorrected by the correction process to a printer.

43. A method according to claim 42, wherein the correction process comprises a bold process.

44. A method according to claim 43, wherein the bold process is executed in different degrees according to different resolutions of the facsimile apparatus.

45. A method according to claim 42, wherein the image processing apparatus is a host computer.

46. A method according to claim 42, wherein the correction process is performed only for the character and the line.

47. A computer readable memory medium for storing an image processing method in an image processing apparatus operable in one of a plurality of modes including a facsimile mode and a print mode, said method comprising the steps of:

when the facsimile mode is designated, performing a correction process to image data including a character or a line so as to avoid deformation of the character or omission of the line in a subsequent printing process of the image data by a facsimile apparatus and transmitting the image data, as corrected by the correction process, to the facsimile apparatus; and when the print mode is designated, outputting the image data uncorrected by the correction process to a printer.

48. A method according to claim 47, wherein the correction process comprises a bold process.

49. A method according to claim 48, wherein the bold process is executed in different degrees according to different resolutions of the facsimile apparatus.

50. A method according to claim 47, wherein the image processing apparatus is a host computer.

51. A method according to claim 47, wherein the correction process is performed only for the character and the line.

* * * * *

UNITED STATES PATENT AND TRADEMARK OFFICE
CERTIFICATE OF CORRECTION

PATENT NO. : 5,802,257

DATED : September 1, 1998

INVENTOR(S) : TAKAHIRO KATO

It is certified that error appears in the above-identified patent and that said Letters Patent is hereby corrected as shown below:

COLUMN 1

Line 11, "describing" should read --description--.

COLUMN 6

Line 14, "describing" should read --description--.

COLUMN 10

Line 29, "A CPU" should read --a CPU--.

Signed and Sealed this

Fourth Day of May, 1999

*Attest:*

Q. TODD DICKINSON

*Attesting Officer* *Acting Commissioner of Patents and Trademarks*